United States Patent
Chuang et al.

(10) Patent No.: US 9,209,733 B2
(45) Date of Patent: Dec. 8, 2015

(54) CONTROL METHOD FOR CONTROLLING A CURRENT VECTOR CONTROLLED SYNCHRONOUS RELUCTANCE MOTOR

(71) Applicant: NATIONAL CHENG KUNG UNIVERSITY, Tainan (TW)

(72) Inventors: Tzu-Shien Chuang, Hsinchu (TW); Mi-Ching Tsai, Tainan (TW); Min-Fu Hsieh, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 111 days.

(21) Appl. No.: 13/683,221

(22) Filed: Nov. 21, 2012

(65) Prior Publication Data

US 2014/0139154 A1 May 22, 2014

(51) Int. Cl.
*H02P 21/00* (2006.01)
*H02P 6/00* (2006.01)
*H02K 19/10* (2006.01)
*H02P 21/14* (2006.01)

(52) U.S. Cl.
CPC .......... *H02P 21/0096* (2013.01); *H02K 19/103* (2013.01); *H02P 21/0035* (2013.01); *H02P 21/146* (2013.01); *Y02T 10/643* (2013.01)

(58) Field of Classification Search
CPC .. B62D 5/046; B62D 5/0463; H02P 21/0035; H02P 21/0096; G01R 33/3453; H02K 3/28; H02K 19/103; Y02T 10/643
USPC .............. 318/400.02, 400.01, 362, 364, 365; 307/151; 363/1–12
See application file for complete search history.

(56) References Cited

U.S. PATENT DOCUMENTS

| | | | |
|---|---|---|---|
| 6,919,663 B2 * | 7/2005 | Iles-Klumpner | 310/156.53 |
| 7,265,505 B2 * | 9/2007 | Nakai et al. | 318/400.09 |
| 2001/0048278 A1 * | 12/2001 | Young et al. | 318/254 |
| 2005/0151491 A1 * | 7/2005 | Nakai et al. | 318/98 |
| 2011/0181135 A1 * | 7/2011 | Pollock et al. | 310/49.46 |
| 2011/0285332 A1 * | 11/2011 | Pollock et al. | 318/400.02 |
| 2012/0235621 A1 * | 9/2012 | Yamada et al. | 318/716 |

* cited by examiner

*Primary Examiner* — Bentsu Ro
*Assistant Examiner* — Zemenay Truneh
(74) *Attorney, Agent, or Firm* — patenttm.us

(57) ABSTRACT

A current vector controlled synchronous reluctance motor and control method thereof, wherein the motor has a coil on each of the teeth. The coils form a U-phase winding, a V-phase winding and a W-phase winding. The phase windings receive a balanced three-phase current vector to induce closed magnetic field lines, such that the coils induce same magnetic poles adjacent to the rotor unit. Two short magnetic routes are formed along three adjacent teeth and the rotor unit. The efficiency of the reluctance motor is high.

3 Claims, 15 Drawing Sheets

CONTROL METHOD FOR CONTROLLING A CURRENT VECTOR CONTROLLED SYNCHRONOUS RELUCTANCE MOTOR

BACKGROUND OF THE INVENTION

1. Field of the Invention

The present invention relates to a motor, and more particularly to a current vector controlled synchronous reluctance motor and control method thereof.

2. Description of Related Art

Permanent magnet synchronous motor (PMSM) is a high efficiency motor including a stator and a rotor. The stator has multiple exciting coils for receiving a three-phase current. The rotor synchronously spins according to a rotating magnetic field generated from the exciting coils while phase currents flow through the exciting coils. However, the stator and the rotor of the PMSM are usually made of rare earth elements. The rare earth elements are expensive materials and may result in environmental pollution. Hence, to manufacture a motor without the rare earth elements is a trend nowadays.

A switched-reluctance motor is a high efficiency motor without the rare earth elements. With reference to FIG. 15, the switched-reluctance motor has a stator 61 and a rotor 62. The stator 61 has a U-phase coil 611, a $\overline{U}$-phase coil 612, a V-phase coil 613, a $\overline{V}$-phase coil 614, a W-phase coil 615 and a $\overline{W}$-phase coil 616. The coils 611-616 are concentration coils and respectively have a current input terminal and a current output terminal. The rotor 62 has four poles 620.

With reference to FIG. 15, the symbols "⊗" and "⊙" respectively indicate the directions of phase currents flowing through the coils 611-616. Taking a plane of FIG. 15 as a reference plane, the symbol "⊗" stands for the phase current flowing into the reference plane and the symbol "⊙" stands for the phase current flowing outward the reference plane.

As an example, the U-phase coil 611 is opposite to the $\overline{U}$-phase coil 612. The current output terminal of the U-phase coil 611 is connected to the current input terminal of the $\overline{U}$-phase coil 612. While a phase current is flowing through the U-phase coil 611 and the $\overline{U}$-phase coil 612, the coils 611, 612 induce magnetic fields in an opposite direction. For example, a magnetic pole induced by the U-phase coil 611 and adjacent to the rotor 62 is N magnetic pole. Another magnetic pole induced by the $\overline{U}$-phase coil 612 and adjacent to the rotor 62 is S magnetic pole. Closed magnetic field lines 70 are formed along the U-phase coil 611, the rotor 62, the $\overline{U}$-phase coil 612 and the stator 61.

With reference to FIG. 16, the position relationship of the poles 620 of the rotor 62 and teeth 617, 618 of the stator 61 is disclosed. The inductance varies with a rotational angle θ, of the rotor 62. Conventionally, a minimal inductance ($L_{min}$) occurs when the rotor 62 induces a maximal reluctance at a certain rotational angle $\theta_r$. A maximal inductance ($L_{max}$) occurs when the rotor 62 induces a minimal reluctance at another certain rotational angle $\theta_r$. The relationship of the rotational angle $\theta_r$ of the rotor 62 and the inductance is linear as indicated by A and B on FIG. 16.

The switched-reluctance motor generates an electromagnetic torque $T_1$ according to the relationship of the rotational angle $\theta_r$ and the inductance. The electromagnetic torque $T_1$ can be expressed as an equation:

$$T_1 = \frac{dW_m}{d\theta_r} = \left[i_k^2 L \frac{\partial L_k(\theta_r)}{\partial \theta_r}\right] = \frac{1}{2} i_k^2 \frac{dL_k(\theta_r)}{d\theta_r}, k = 1, 2, 3 \ldots$$

wherein k stands for a phase and $$\frac{dL_k(\theta_r)}{d\theta_r}$$

is a phase inductance increasing ratio and can be expressed as:

$$\frac{dL_k(\theta_r)}{d\theta_r} = \begin{cases} M, & \theta_r \text{ is in the interval } A; \\ -M, & \theta_r \text{ is in the interval } B; \\ 0, & \theta_r \text{ is in the interval } C. \end{cases}$$

wherein M is a positive real constant.

However, the equations mentioned above are only adapted for a motor operating in a low speed. When the motor operates at a high speed or is connected to a load which is gradually increased, the phase inductance increasing ratio is not a constant anymore, resulting in high torque ripple and noise.

SUMMARY OF THE INVENTION

An objective of the present invention is to provide a current vector controlled synchronous reluctance motor and control method thereof. The winding rule of the phase windings and motor's control method are different from the conventional motor and the conventional method. The efficiency of the reluctance motor of the invention is improved and the noise decreases.

The synchronous reluctance motor of the invention comprises:

a rotor unit having 4×N poles, wherein N is a positive integer; and a stator unit mounted around the rotor unit and having 6×N teeth respectively defined as a first tooth, a second tooth . . . and a $6N^{th}$ tooth; wherein each tooth has a coil mounted thereon in a same direction to form a U-phase winding, a V-phase winding and a W-phase winding;

the U-phase winding is composed of the coils connected in series on the $3K+1^{th}$ teeth, K=0 to (2N−1);

the V-phase winding is composed of the coils connected in series on the $3K+2^{th}$ teeth, K=0 to (2N−1);

the W-phase winding is composed of the coils connected in series on the $3K+3^{th}$ teeth, K=0 to (2N−1);

the U-phase winding, the V-phase winding and the W-phase winding are connected to form a Y connection circuit;

the coils generate magnetic field lines according to a balanced three-phase current applied to the U-phase winding, the V-phase winding and the W-phase winding; in the teeth of each phase winding, the coils induce same magnetic poles; magnetic routes are formed along adjacent teeth and the rotor unit.

The method for controlling the reluctance motor including the steps of:

correspondingly providing a balanced three-phase current vector on the U-phase winding, the V-phase winding and the W-phase winding;

calibrating a zero point position of a position encoder of the rotor unit;

adjusting an amplitude and a phase angle of the balanced three-phase current vector to control the phase angle to exceed the zero point position by δ degrees according to a base speed and a rated load of the reluctance motor, wherein δ=45°;

determining whether a present speed of the reluctance motor is faster than the base speed;

increasing the phase angle of the balanced three-phase current vector when the present speed is faster than the base speed, wherein the phase angle is limited to be lower than an upper limit value but larger than 45°; and decreasing the phase angle of the balanced three-phase current vector when the present speed is slower than the base speed, wherein the phase angle is limited to be larger than a lower limit value but less than 45°.

According to the winding rule of the coils of the invention, as an example, the amplitude of a U-phase current is maximum among a 60° commutation region. Flowing directions of a V-phase current and a W-phase current are opposite to the flowing direction of the U-phase current. Therefore, the coils of the U-phase winding on the teeth induce same magnetic poles adjacent to the rotor unit. The magnetic poles generated from the coils of the V-phase winding and the W-phase winding are opposite to the magnetic poles generated from the U-phase winding. Then two magnetic routes are respectively formed along the adjacent teeth for generating closed magnetic field lines. The magnetic route of the invention is much shorter than that of a conventional motor. As a result, the magnetic loss of the invention is less than that of the conventional motor. The efficiency of the invention is improved.

In addition, the method of the invention is to provide the balanced three-phase current to the U-phase winding, the V-phase winding and the W-phase winding synchronously, which is different from that of a conventional switched-reluctance motor. According to experiment data, the efficiency, noise performance and torque of the invention are better than those of the conventional switched-reluctance motor.

DETAILED DESCRIPTION OF THE PREFERRED EMBODIMENT

Figure 1:
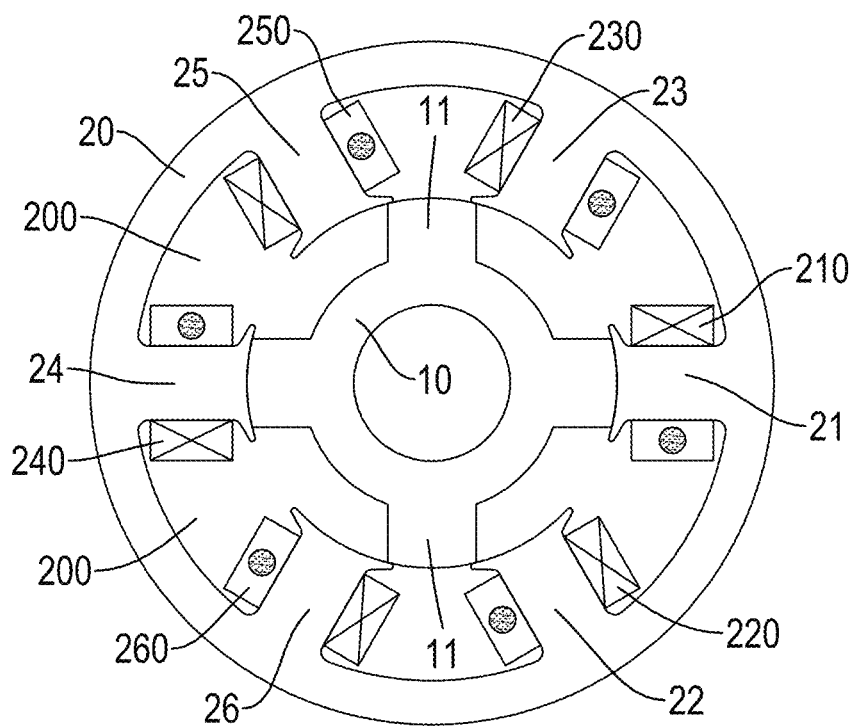
FIG. 1 is a plan view of a first embodiment (N=1) of the motor of the invention.

With reference to FIG. 1, the synchronous reluctance motor of this invention has a rotor unit 10 and a stator unit 20.

The rotor unit 10 has 4×N poles 11, wherein N is a positive integer.

The stator unit 20 is mounted around the rotor unit 10 and has 6×N teeth 21-26. The teeth are defined as a first tooth, a second tooth . . . and a $6N^{th}$ tooth. A wire groove 200 is formed between two adjacent teeth. Multiple coils 210-260 are respectively mounted on the teeth 21-26 in a same direction as a winding rule. In this embodiment, the coils 210-260 are concentration coils. Each coil 210-260 has a head terminal and a tail terminal. The head terminal acts as a current input terminal and the tail terminal acts as a current output terminal. The tail terminal of one coil is connected to the head terminal of an opposite coil. Hence, two coils are connected to each other in series to form a phase winding.

With reference to FIG. 1, the symbols "⊗" and "⊙" respectively indicate the directions of phase currents flowing through the coils 210-260. Taking a plane of FIG. 1 as a reference plane, the symbol "⊗" stands for the phase current flowing into the reference plane and the symbol "⊙" stands for the phase current flowing outward the reference plane.

Figure 2:
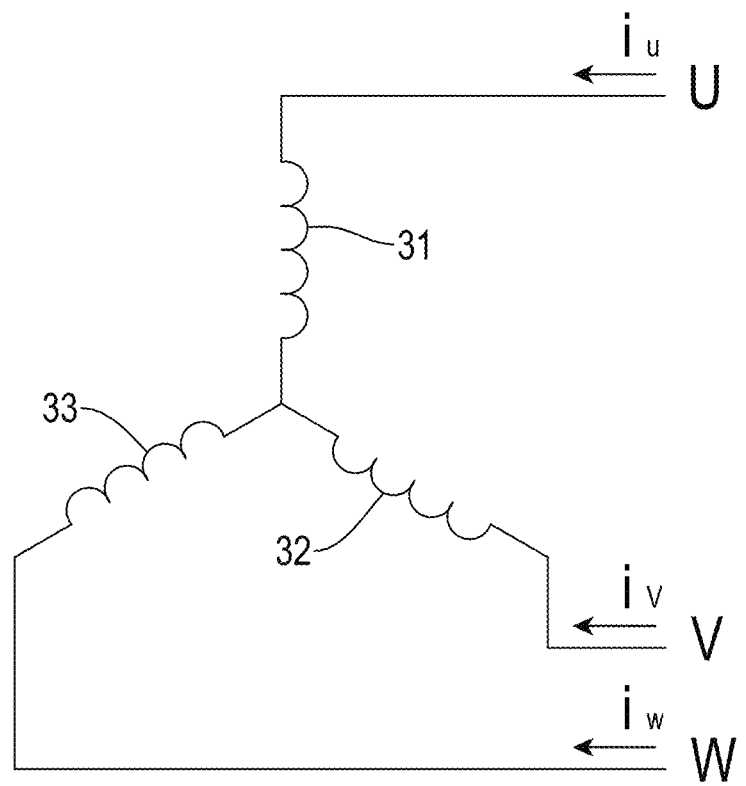
FIG. 2 is a circuit diagram of the U-phase winding, the V-phase winding and the W-phase winding.

With reference to FIGS. 1 and 2, each connected two coils 210-260 is respectively defined as a U-phase winding 31, a V-phase winding 32 and a W-phase winding 33. The phase windings 31-33 respectively receive balanced three-phase currents including a U-phase current $i_u$, a V-phase current $i_v$ and a W-phase current $i_w$. The U-phase winding 31 is composed of the coils connected in series on the $3K+1^{th}$ teeth, K=0 to (2N−1). The V-phase winding 32 is composed of the coils connected in series on the $3K+2^{th}$ teeth, K=0 to (2N−1). The W-phase winding 33 is composed of the coils connected in series on the $3K+3^{th}$ teeth, K=0 to (2N−1). The tail terminals of the phase windings 31-33 are connected to form a Y connection circuit.

In this embodiment, N is 1. The rotor unit 10 has four poles 11. The stator unit 20 has six teeth 21-26 defined as a first tooth 21, a second tooth 22, a third tooth 23, a fourth tooth 24, a fifth tooth 25 and a sixth tooth 26. The U-phase winding 31 is composed of two coils 210, 240 connected in series on the first tooth 21 and the fourth tooth 24. The V-phase winding 32 is composed of two coils 220, 250 connected in series on the second tooth 22 and the fifth tooth 25. The W-phase winding 33 is composed of two coils 230, 260 connected in series on the third tooth 23 and the sixth tooth 26. For convenience of description, the coils 210-260 on the teeth 21-26 are respectively defined as a U-phase coil 210, a Ū-phase coil 240, a V-phase coil 220, a V̄-phase coil 250, a W-phase coil 230 and a W̄-phase coil 260. The U-phase coil 210 and the Ū-phase coil 240 are respectively twisted on opposite teeth, such as the first tooth 21 and the fourth tooth 24. The V-phase coil 220 and the V̄-phase coil 250 are respectively mounted on the second tooth 22 and the fifth tooth 25. The W-phase coil 230 and the W̄-phase coil 260 are respectively mounted on the third tooth 23 and the sixth tooth 26.

Figure 3:
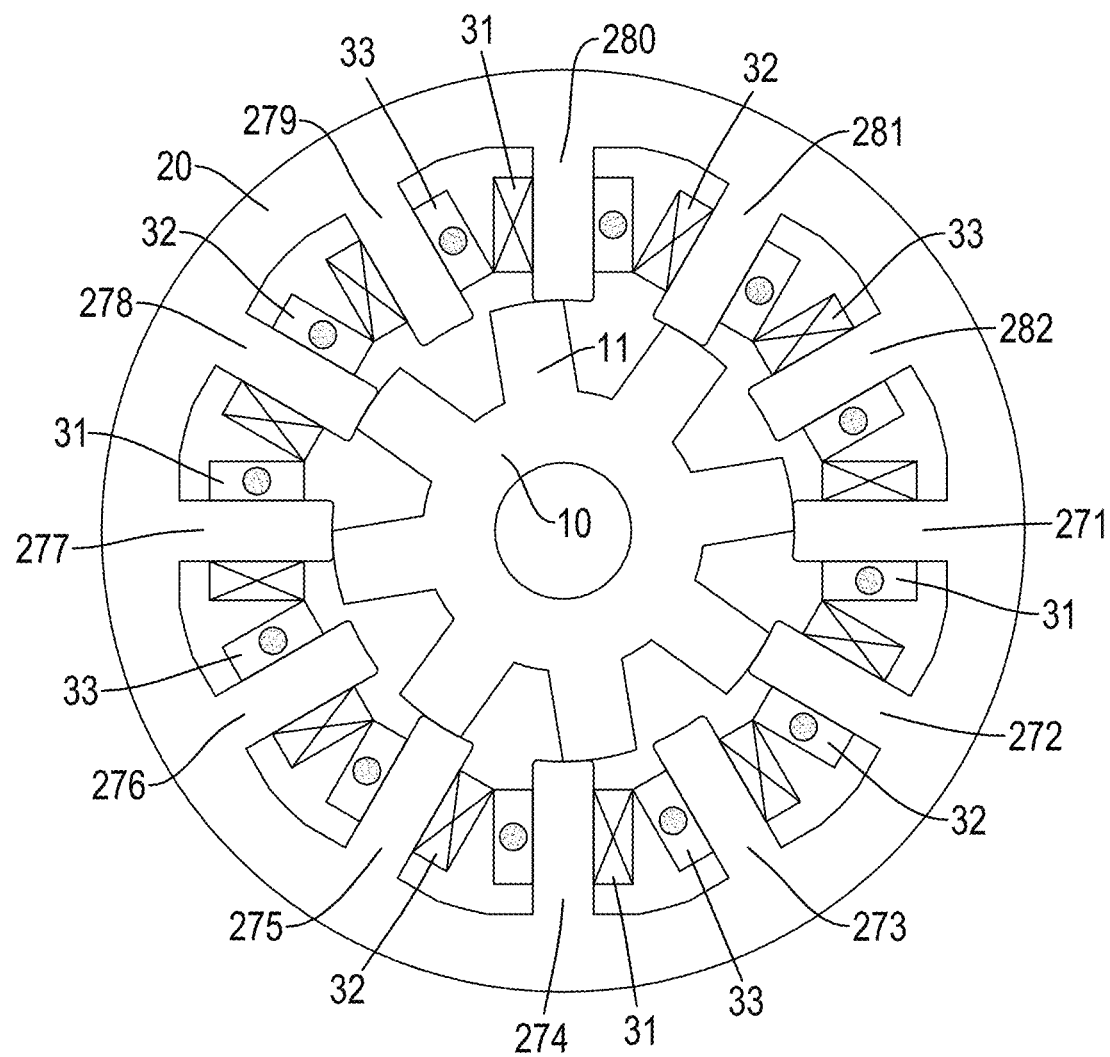
FIG. 3 is a plan view of a second embodiment (N=2) of the motor of the invention.

Similarly, with reference to FIG. 3, a stator unit 20 of N=2 of a second embodiment is disclosed. The rotor unit 10 has eight poles 11 and the stator unit 20 has twelve teeth 271-282. The U-phase winding 31 is composed of coils connected in series and respectively mounted on a first tooth 271, a forth tooth 274, a seventh tooth 277 and a tenth tooth 280. The V-phase winding 32 is composed of coils connected in series and respectively mounted on a second tooth 272, a fifth tooth 275, an eighth tooth 278 and an eleventh tooth 281. The W-phase winding 33 is composed of coils connected in series and respectively mounted on a third tooth 273, a sixth tooth 276, a ninth tooth 279 and a twelfth tooth 282.

The following description takes N=1 as an example.

Figure 4:
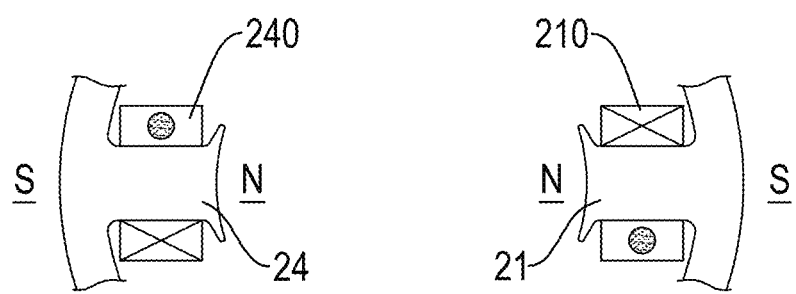
FIG. 4 is a reference view of magnetic poles generated from the coils.

With reference to FIG. 2, while the U-phase current $i_u$ is flowing through the U-phase coil 210 and the $\overline{U}$-phase coil 240, according to the winding rule of the coils 210, 240, the coils 210, 240 induce same magnetic poles adjacent to the rotor unit 10. With reference to FIG. 4, the N magnetic pole induced by the U-phase coil 210 is adjacent to the rotor unit 10. The N magnetic pole induced by the $\overline{U}$-phase coil 240 is also adjacent to the rotor unit 10.

Figure 5A:
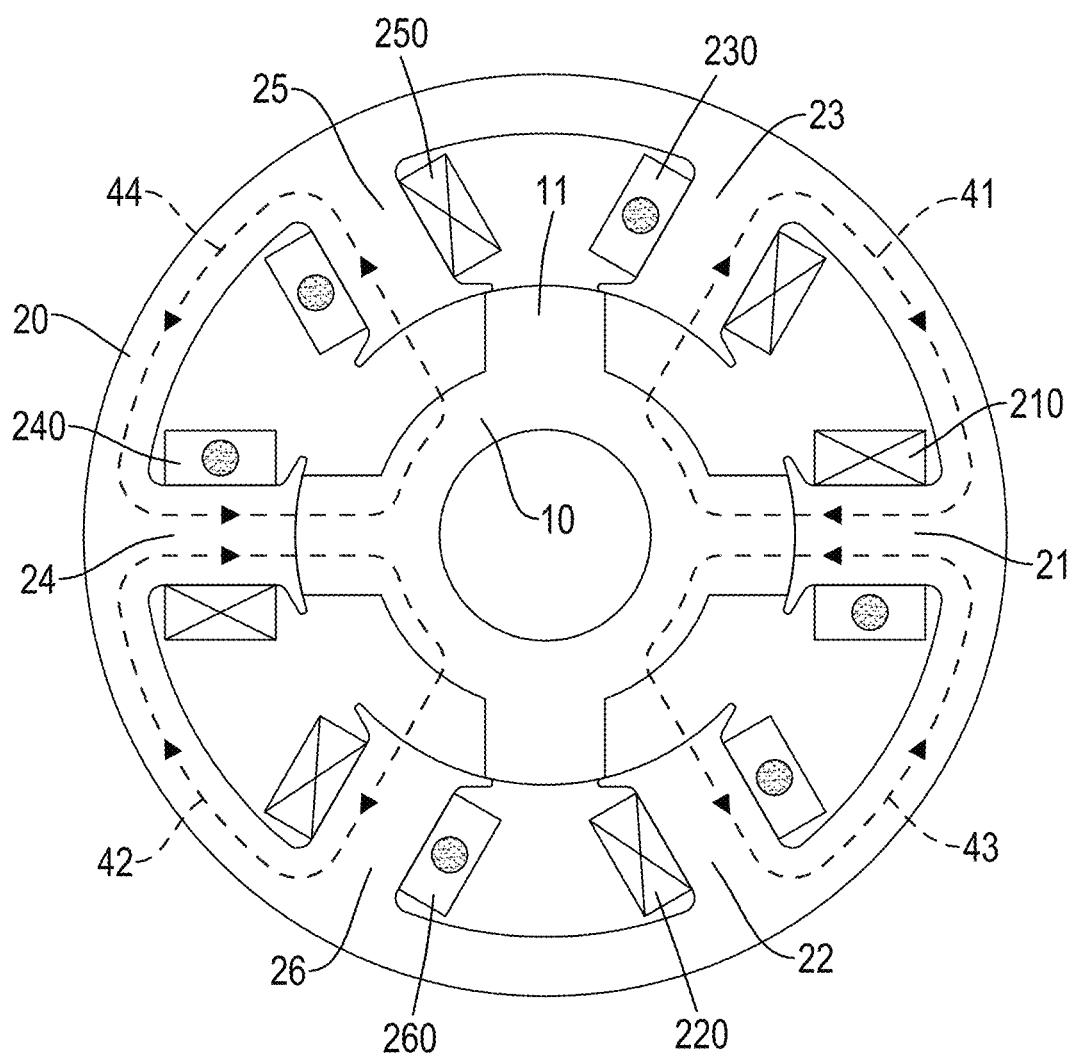
FIG. 5A is a reference view of magnetic field lines formed in the magnetic routes of a 6/4 pole reluctance motor of the invention.

One period of the U-phase current $i_u$ of the balanced three-phase currents is composed of six commutation regions, which includes 0°-60°, 60°-120°, 120°-180°, 180°-240°, 240°-300° and 300°-360°. For example, when the phase angle of the U-phase current $i_u$ is operated among the first commutation region, such as 0°-60°, the amplitude of the U-phase current $i_u$ is greater than that of the V-phase current $i_v$ and the W-phase current $i_w$. The flowing direction of the U-phase current $i_u$ is opposite to both the V-phase current $i_v$ and the W-phase current $i_w$. With reference to FIG. 5A, as a result, the V-phase current $i_v$ and the W-phase current $i_w$ induces S magnetic pole adjacent to the rotor unit 10. A short magnetic route is formed along the first tooth 21, the third tooth 23 and the rotor unit 10 for generating closed magnetic field lines 41.

Similarly, a short magnetic route is formed along the forth tooth 24, the sixth tooth 26 and the rotor unit 10 for generating closed magnetic field lines 42. Another short magnetic route is formed along the first tooth 21, the second tooth 22 and the rotor unit 10 for generating closed magnetic field lines 43. Further another short magnetic route is formed along the forth tooth 24, the fifth tooth 25 and the rotor unit 10 for generating closed magnetic field lines 44.

In short, when the phase angle of the U-phase current $i_u$ of the balanced three-phase currents is operated among anyone of six commutation regions, the teeth 21-26 and the rotor unit 10 generate four magnetic routes. As the magnetic fields of the windings 31-33 change, the rotor unit 10 rotates.

Figure 15:
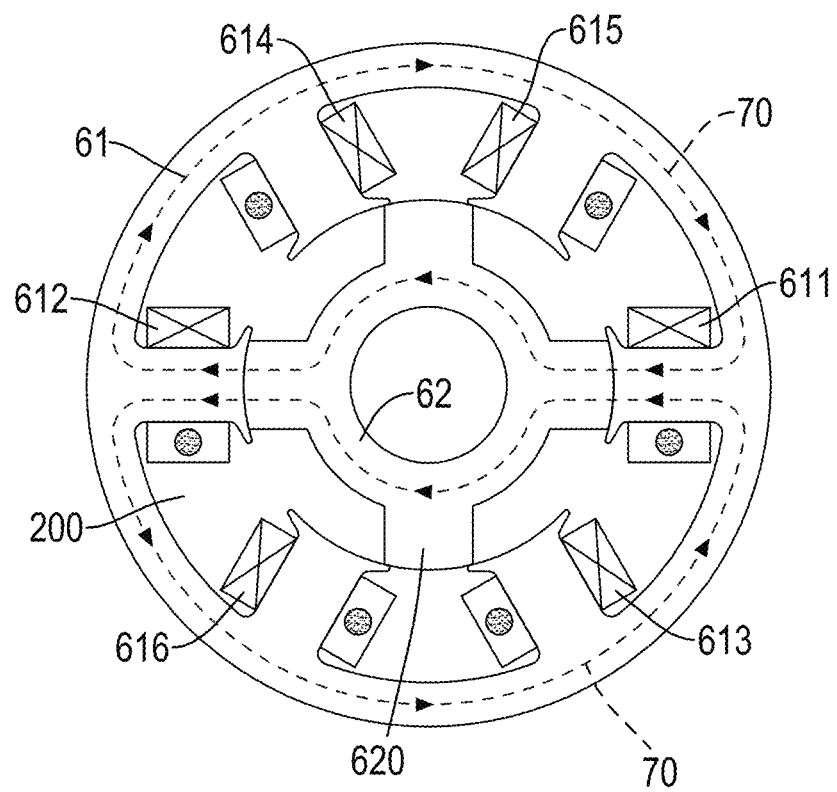
FIG. 15 is a plain view of a conventional motor.
Figure 16:
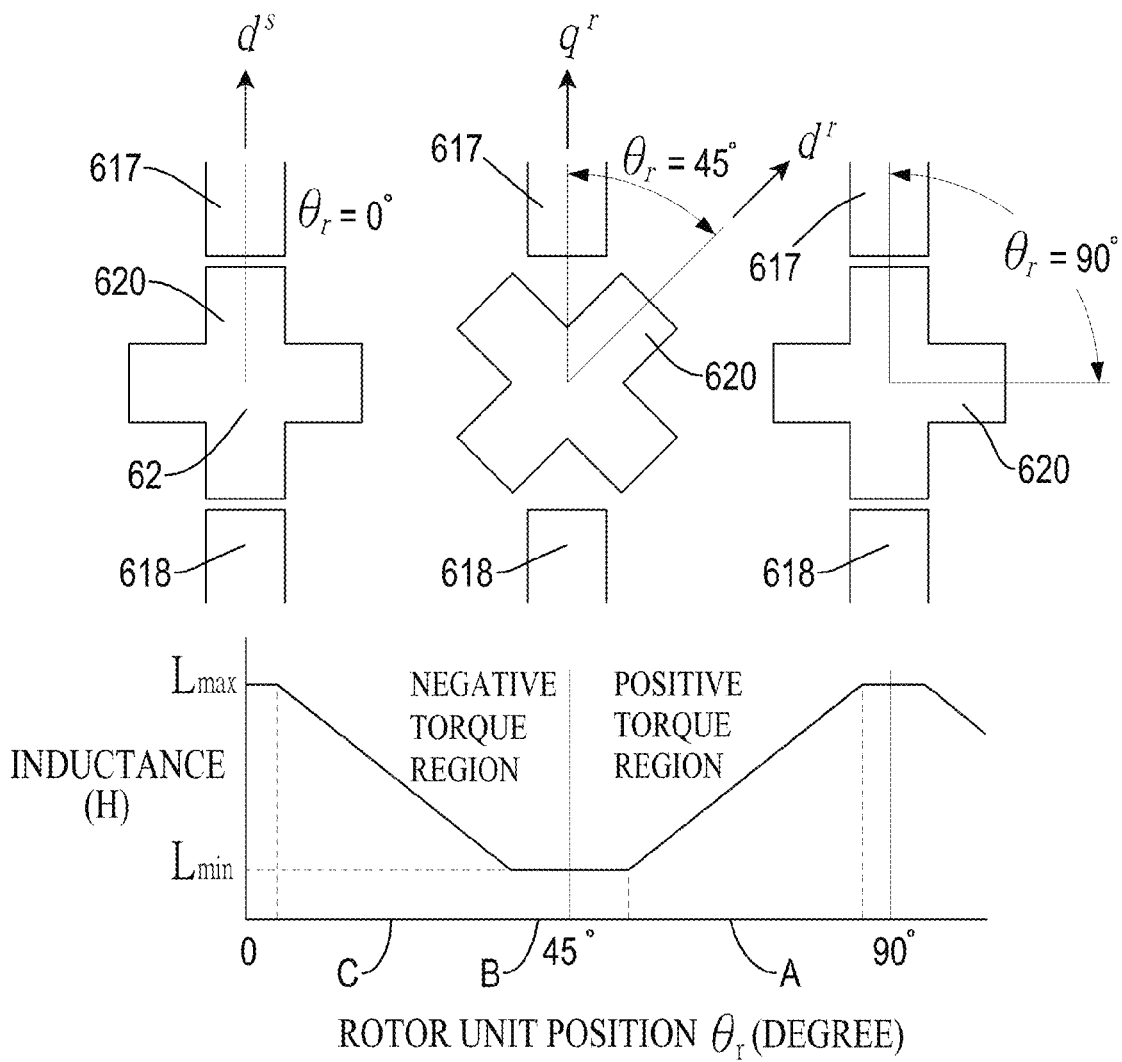
FIG. 16 is a reference view of a relationship of a rotor position and inductance of a conventional motor.

With reference to FIG. 5A, the winding rule of the coils of this invention forms four magnetic routes for generating closed magnetic field lines 41-44. Compared with the conventional magnetic route of FIG. 15, the magnetic route of the invention is much shorter. The magnetic loss of the invention is lower than that of the conventional motor. The efficiency of the invention is improved.

Figure 5B:
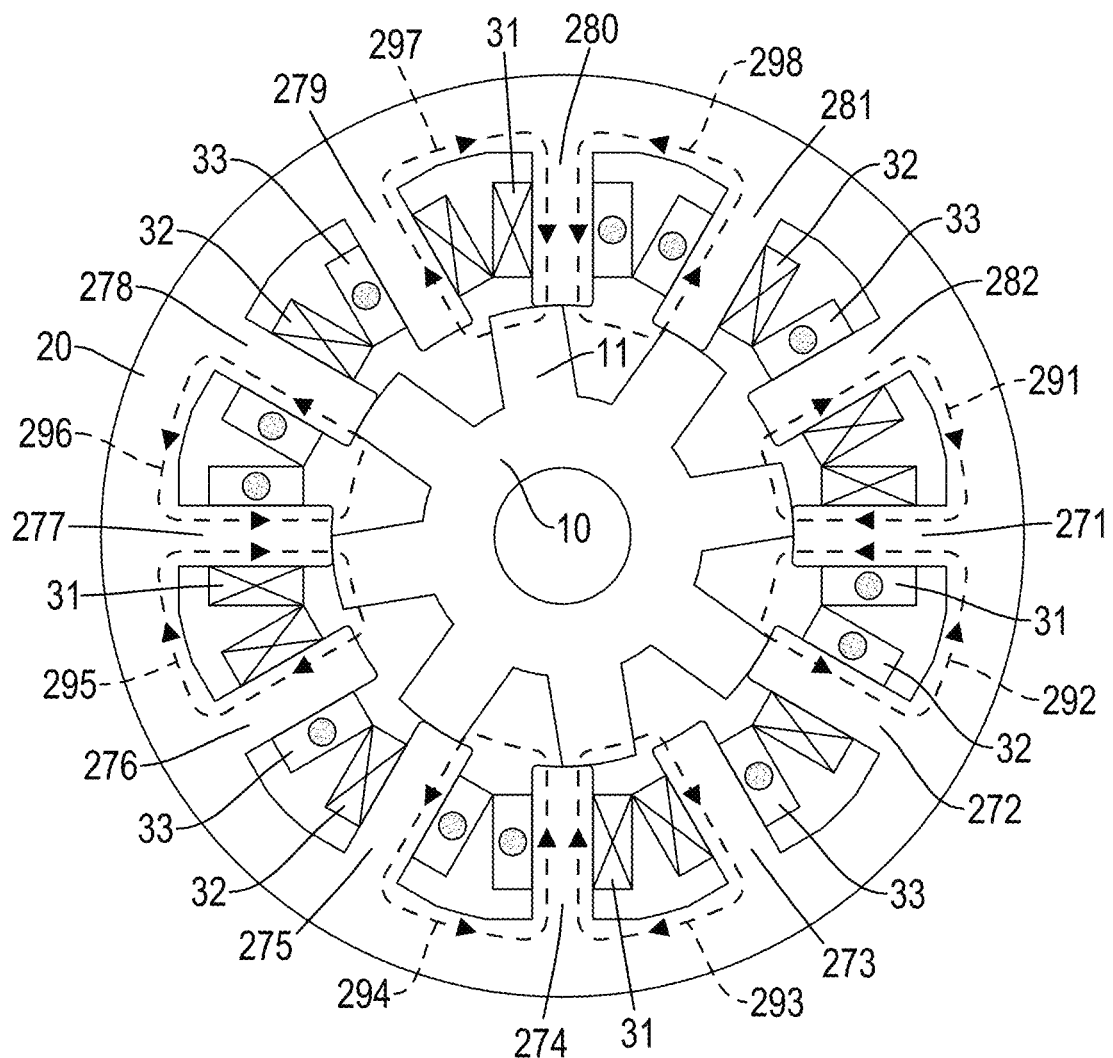
FIG. 5B is a reference view of magnetic field lines formed in the magnetic routes of a 12/8 pole reluctance motor of the invention.

The winding rule is also adapted for the second embodiment illustrated in FIG. 5B. When the U-phase current $i_w$ of the balanced three-phase currents is operated among anyone of the six commutation regions as mentioned above, the coils on the teeth 271-282 respectively form eight magnetic routes for respectively generating closed magnetic field lines 291-298. For providing high power conversion efficiency, the magnetic lines in the magnetic routes are repeatedly formed according to the balanced three-phase current in every cycle, i.e. every six commutation regions.

In order to efficiently drive the reluctance motor of the invention, the present invention also provides a control method. The control method mainly adjusts an amplitude and a phase angle of the balanced three-phase current vector $I_s$ applied to the phase windings 31-33 according to a speed (RPM) of the motor.

Figure 6:
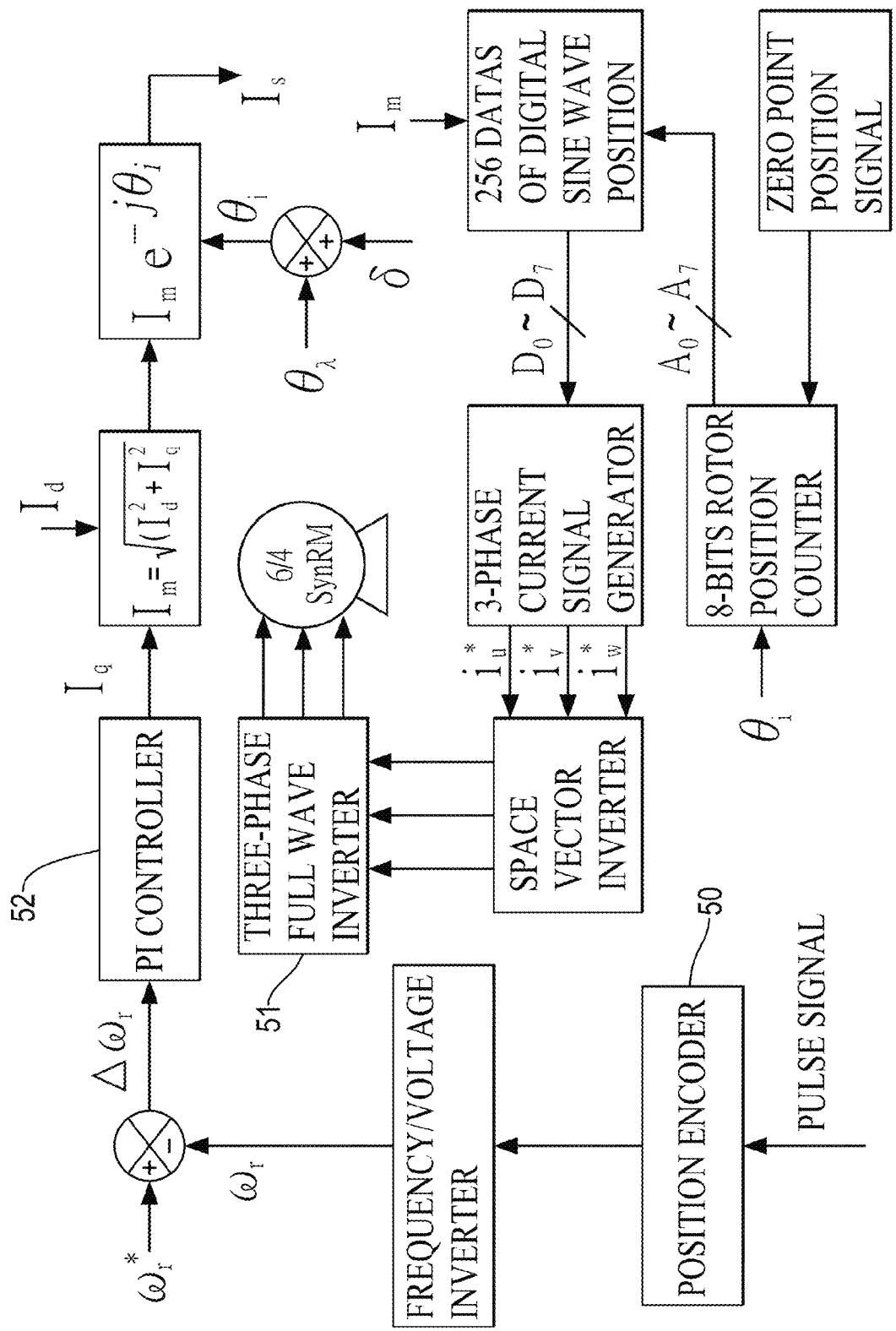
FIG. 6 is a control system block diagram executing the method of the invention.
Figure 7:
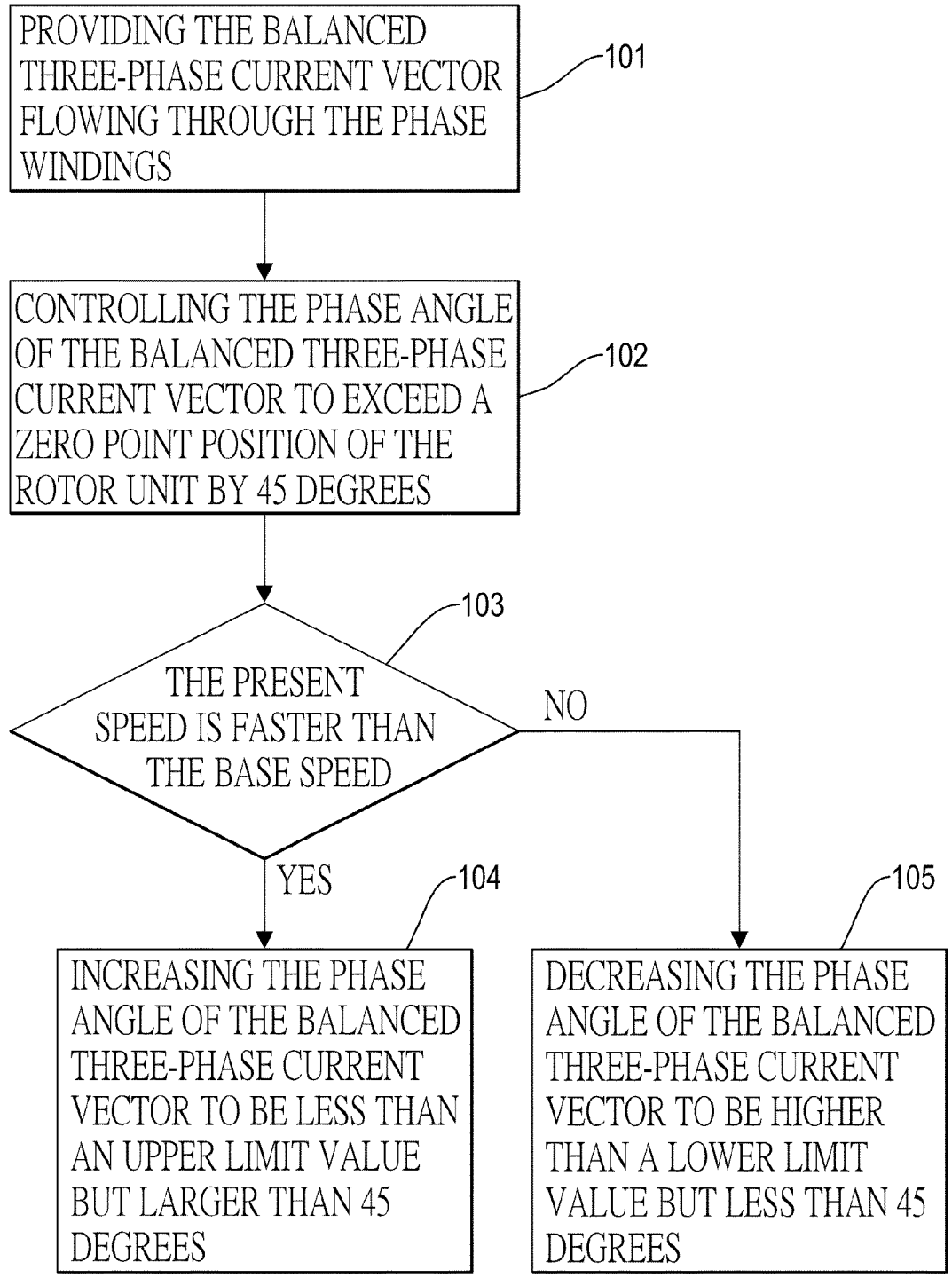
FIG. 7 is a flow chart of the method of the invention.

With reference to FIG. 6, a control system is disclosed. A present speed $\omega_r$ and the position of the rotor unit 10 are detected by a position encoder 50. The balanced three-phase current vector $I_s$ is generated through a three-phase full wave inverter 51. The balanced three-phase current vector $I_s$ is generated based on a base speed $\omega_r^*$ and a rated load. With reference to FIG. 7, the control method of the invention is described below.

A first step of the method is to provide the balanced three-phase current vector $I_s$ to the corresponding phase windings 31-33 (step 101). The balanced three-phase current vector $I_s$ includes the U-phase current $i_u$, the V-phase current $i_v$ and the W-phase current $i_w$. The following paragraphs describe a setting rule of the balanced three-phase current vector $I_s$.

Figure 8:
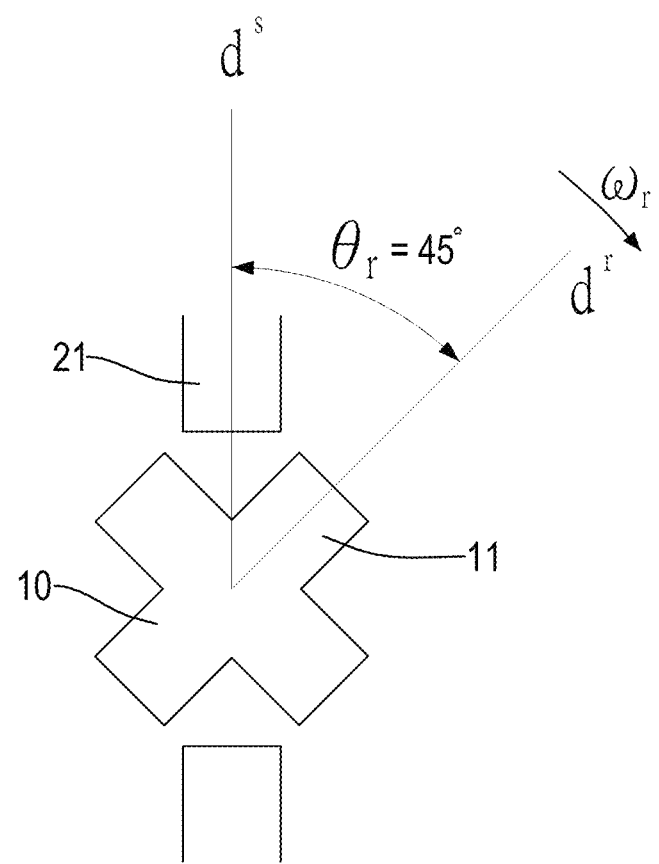
FIG. 8 is a reference view of a rotational angle of the rotor unit.

With reference to FIG. 8, taking the first tooth 21 as an example, a rotational angle $\theta_r$ is defined as the angle between a central axis $d^s$ of the first tooth 21 and a central axis $d^r$ of the pole 11 of the rotor unit 10.

Figure 9:
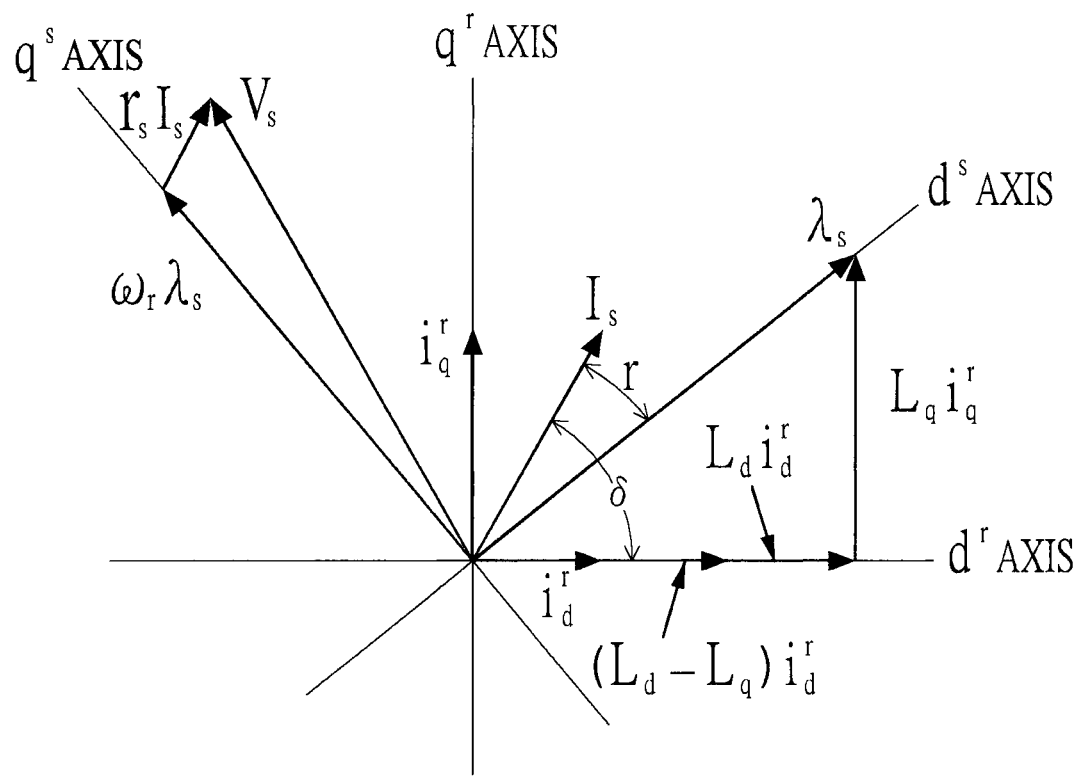
FIG. 9 is a space vector diagram of the motor of the invention.

With reference to FIG. 9, the central axis of the first tooth 21 is defined as a $d^s$ axis of a $d^s$-$q^r$ stator coordinate system. The central axis of the pole 11 is defined as a $d^r$ axis of a $d^r$-$q^r$ rotor coordinate system. An angle difference between the $d^s$ axis and the $d^r$ axis is defined as $\theta_e$, wherein $$\theta_e = \frac{P\theta_r}{2},$$

P is a pole number. By using Clarke transformation and Park transformation, the coordinate of the first tooth 21 can be transformed to the $d^r$-$q^r$ rotor coordinate system from the $d^s$-$q^s$ stator coordinate system. After the coordinate transformations, the balanced three-phase current vector $I_s$ and a counter electromotive force vector $V_s$ can be expressed as equations (1) and (2) as below.

$$\begin{bmatrix} I_q \\ I_d \end{bmatrix} = \frac{2}{3}\begin{bmatrix} \cos\theta_e & \cos\left(\theta_e - \frac{2\pi}{3}\right) & \cos\left(\theta_e + \frac{2\pi}{3}\right) \\ \sin\theta_e & \sin\left(\theta_e - \frac{2\pi}{3}\right) & \sin\left(\theta_e + \frac{2\pi}{3}\right) \end{bmatrix}\begin{bmatrix} i_u \\ i_v \\ i_w \end{bmatrix} \quad (1)$$

$$\begin{bmatrix} V_q \\ V_d \end{bmatrix} = \frac{2}{3}\begin{bmatrix} \cos\theta_e & \cos\left(\theta_e - \frac{2\pi}{3}\right) & \cos\left(\theta_e + \frac{2\pi}{3}\right) \\ \sin\theta_e & \sin\left(\theta_e - \frac{2\pi}{3}\right) & \sin\left(\theta_e + \frac{2\pi}{3}\right) \end{bmatrix}\begin{bmatrix} v_u \\ v_v \\ v_w \end{bmatrix} \quad (2)$$

$I_d$ stands for an exciting current. $I_q$ stands for a torque current. $I_d$ and $I_q$ respectively stand for DC components of the balanced three-phase current vector $I_s$ on the $q^r$ axis and the $d^r$ axis. $V_d$ and $V_q$ respectively stand for DC components of the counter electromotive force vector $V_s$.

An electric power $P_e$ of the reluctance motor can be defined as equation (3) derived from the equations (1) and (2).

$$P_e = 3/2[V_q I_q + V_d I_d] \quad (3)$$

An electromagnetic torque $T_e$ of the reluctance motor can be defined as equation (4) derived from the electric power $P_e$.

$$T_e = \frac{P_e}{\omega_r} = \frac{3/2}{\omega/(P/2)}[(\omega L_d I_d I_q - \omega L_q I_q I_d)] = \quad (4)$$

$$\frac{3P}{4}[(L_d - L_q)I_d I_q] = \frac{3P}{4}[(L_d - L_q)I_m^2 \sin 2\delta]$$

P is a pole number;

$\omega_r$ is an angular frequency of the rotor unit 10 (rad/s);

$\omega$ is an operating frequency of the balanced three-phase current vector $I_s$;

$L_q$ and $L_d$ respectively stand for inductance on the $q^r$ axis and the $d^r$ axis of the $d^r$–$d^r$ rotor coordinate system;

$I_m$ is an amplitude of the balanced three-phase current vector $I_s$; and $\delta$ is the angle formed between the balanced three-phase current vector $I_s$ and the $d^r$ axis in the $d^r$–$q^r$ rotor coordinate system and is also defined as a torque angle.

According to the equation (4), when the torque angle is 45°, the electromagnetic torque $T_e$ has a maximum value. The exciting current $I_d$, the torque current $I_q$, the amplitude $I_m$ of the balanced three-phase current vector $I_s$ and the torque angle $\delta$ satisfy the equations (5) and (6).

$$I_q = I_m \sin \delta \quad (5)$$

$$i_d = I_m \cos \delta \quad (6)$$

According to the equation (4), the electromagnetic torque $T_e$ is determined by the inductance difference $L_d$–$L_q$, the exciting current $I_d$ and the torque current $I_q$. The amplitude $I_m$ of the balanced three-phase current vector $I_s$ and phase angle $\delta$ can be expressed as the equations (7) and (8).

$$I_m = \sqrt{I_d^2 + I_q^2} \quad (7)$$

$$\delta = \tan^{-1}\left(\frac{I_q}{I_d}\right) \quad (8)$$

According to the equation (4), the reluctance motor of the invention can be regarded as a DC motor. The method of the invention obtains the exciting current $I_d$ and the torque current based on the parameters ($L_q$, $L_d$, $\delta$, etc.) of the reluctance motor. When the exciting current $I_d$ and the torque current $I_q$ are obtained, the balanced three-phase current vector $I_s$ for the reluctance motor can be calculated by using an inverse-Park transformation in the $d^s$–$q^s$ stator coordinate system. The balanced three-phase current vector $I_s$ is described as the equation (9).

$$I_s = \begin{bmatrix} i_u \\ i_v \\ i_w \end{bmatrix} = I_m \begin{bmatrix} \cos(\omega_e t) & \sin(\omega_e t) \\ \cos\left(\omega_e t - \frac{2\pi}{3}\right) & \sin\left(\omega_e t - \frac{2\pi}{3}\right) \\ \cos\left(\omega_e t + \frac{2\pi}{3}\right) & \sin\left(\omega_e t + \frac{2\pi}{3}\right) \end{bmatrix} \begin{bmatrix} I_q \\ I_d \end{bmatrix} \quad (9)$$

$\omega_e$ stands for an angular frequency of the balanced three-phase current vector $I_s$ received by the phase windings 31-33. According to the equations (5), (6) and (9), the balanced three-phase current vector $I_s$ can be expressed as the equation (10).

$$I_s = \begin{bmatrix} i_u \\ i_v \\ i_w \end{bmatrix} = I_m \begin{bmatrix} \cos(\omega_e t + \delta) & \sin(\omega_e t + \delta) \\ \cos\left(\omega_e t - \frac{2\pi}{3} + \delta\right) & \sin\left(\omega_e t - \frac{2\pi}{3} + \delta\right) \\ \cos\left(\omega_e t + \frac{2\pi}{3} + \delta\right) & \sin\left(\omega_e t + \frac{2\pi}{3} + \delta\right) \end{bmatrix} \quad (10)$$

The phase windings 31-33 receive the balanced three-phase current vector $I_s$ as equation (10) from the three-phase full wave inverter 51.

A current error function is defined as the equation (11).

$$\sigma = i_{sk}^*(t) - i_{sk}(t), \text{ wherein } k = u, v \text{ or } w \quad (11)$$

A current control rule for the phase windings 31-33 can be defined as below.

$$i_{sk}(t) = i_{sk}^*(t) - I_m, \text{ wherein } \sigma \leq -\epsilon, \frac{d\sigma}{dt} \leq -\eta; \quad (12)$$

$$i_{sk}(t) = i_{sk}^*(t) + I_m, \text{ wherein } \sigma \geq +\epsilon, \frac{d\sigma}{dt} \geq +\eta;$$

$$i_{sk}(t) = i_{sk}^*(t) - I_m\left[K_p\sigma + K_i \int \sigma dt\right],$$

wherein $-\epsilon \leq \sigma \leq +\epsilon$ $i_{sk}$ stands for the instantaneous current in the k-phase winding;

$\eta$ stands for a line current error function;

$\epsilon$ stands for an error tolerant constant of the line current error function;

$K_p$ stands for a selected ratio constant; and $K_i$ stands for a selected integral constant.

After the three-phase full wave inverter 51 provides the balanced three-phase current vector $I_s$ to the phase windings 31-33, the control system adjusts the amplitude and the phase angle of the balanced three-phase current vector $I_s$ according to the base speed $\omega_r^*$ and the rated load. The phase angle of the balanced three-phase current vector $I_s$ is controlled to exceed a zero point position of the rotor unit 10 (step 102). The control system of this invention calibrates the zero point position of the rotor unit 10 by the position encoder 50. The zero point position of the rotor unit 10 acts as a reference point for adjusting the phase angle of the balanced three-phase current vector $I_s$. According to the equation (4), when the torque angle $\delta$ is 45°, it means that the phase angle of the balanced three-phase current vector $I_s$ exceeds the zero point position of the rotor unit 10 by 45°, such that the reluctance motor can output a maximum electromagnetic torque $T_e$.

When the reluctance motor of the invention is working, a present speed $\omega_r$ of the reluctance motor is detected by the position encoder 50. With reference to FIG. 6, the control system determines whether the present speed $\omega_r$ is faster than base speed $\omega_r^*$ (step 103).

When the present speed $\omega_r$ is faster than the base speed $\omega_{rb}^*$, in order to maintain high efficiency or prevent the efficiency from decreasing, the control system of the invention gradually increases the phase angle, i.e. the torque angle $\delta$, of the balanced three-phase current vector $I_s$. However, the phase angle of the balanced three-phase current vector $I_s$ should be controlled to be larger than 45° but less than an upper limit value. In this embodiment, the upper limit value is 60° exceeding the zero point position (step 104).

When the present speed $\omega_r$ is slower than the base speed $\omega_{rb}^*$, in order to increase the efficiency, the control system of the invention gradually decreases the phase angle, i.e. the torque angle δ, of the balanced three-phase current vector $I_s$. However, the phase angle of the balanced three-phase current vector $I_s$ should be controlled to be larger than a lower limit value but less than 45°. In this embodiment, the lower limit value is 30° exceeding the zero point position (step 105). In conclusion, the method of the invention adjusts the phase angle of the balanced three-phase current vector $I_s$ according to the present speed and the base speed of the reluctance motor.

With reference to FIG. 6, the control system has a first control loop and a second control loop. The first control loop controls the electromagnetic torque $T_e$. The second control loop controls the speed of the reluctance motor. The control system calculates the present speed $\omega_r$ according to pulse signals generated by the position encoder 50 in a unit time. The control system calculates a speed difference $\Delta\Omega_r$ between the present speed $\omega_r$ and the base speed $\omega_{rb}^*$. A PI controller 52 then calculates the exciting current $I_d$ and the torque current $I_q$ using the speed difference $\Delta\omega_r$. The balanced three-phase current vector $I_s$ is calculated according to the equations (4)-(9). Hence, the reluctance motor can output the electromagnetic torque $T_e$. A time-variant electromagnetic torque $T_e(t)$ of the reluctance motor can be expressed as the equation (13).

$$J\frac{d\omega_r(t)}{dt} + B\omega_r(t) + \tau_L(t) = T_e(t) \quad (13)$$

J is a rotation inertia coupled on a shaft of the motor;
B is a damping coefficient on a shaft of the motor;
$\omega_r$ is the speed of the rotor unit 10; and
$\tau_L$ is a load torque.

The motor parameters, such as $L_q$, $L_d$ and δ, can be detected or designed. The reluctance motor of the invention can be regarded as a DC motor. The DC motor satisfies the equation (4) according to the exciting current $I_d$ and the torque current $I_q$. When the exciting current $I_d$ and the torque current $I_q$ are obtained, the control system outputs the balanced three-phase current vector $I_s$ via the three-phase full wave inverter 51 by the Park inverse transformation according to the equations (10) and (12).

Figure 10:
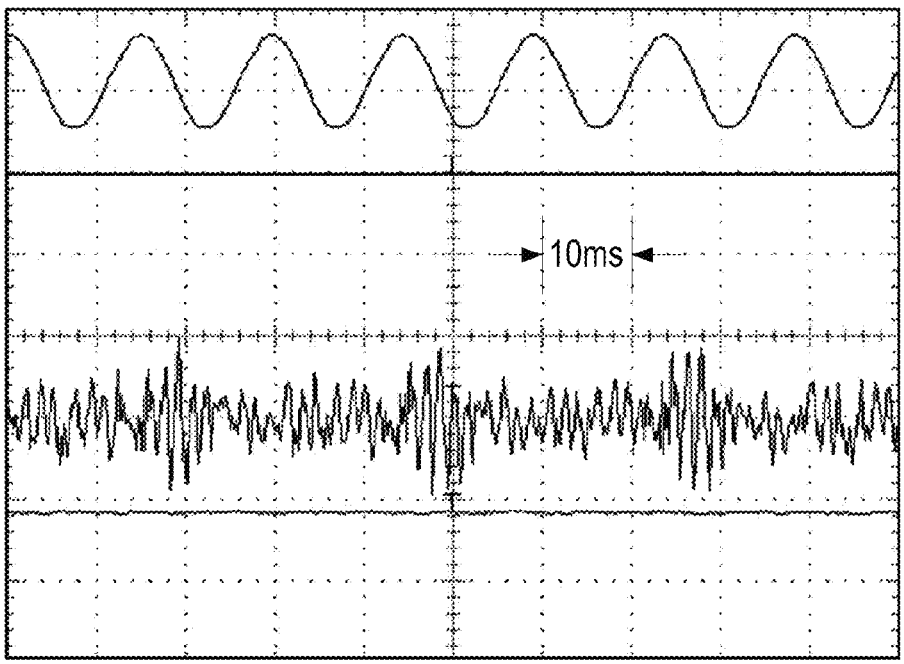
FIG. 10 is a wave diagram of a phase current, speed, noise and torque of the motor of the invention.
Figure 11:
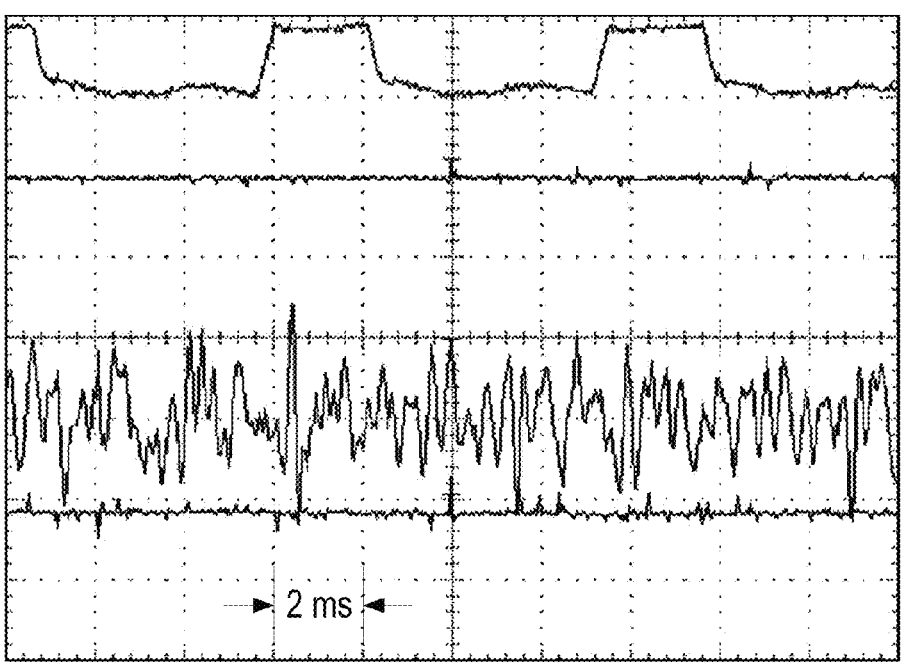
FIG. 11 is a wave diagram of a phase current, speed, noise and torque of a conventional motor.

With reference to FIG. 10, under the rated load and a base speed (2000 RPM), the noise of the reluctance motor of the invention is lower than 75 dB. The anti-noise performance of the invention is better than that of the conventional motor, wherein the anti-noise performance of the conventional motor is shown in FIG. 11. In addition, with reference to FIGS. 10 and 11, the torque ($\tau_{sf}$) and speed ($\omega_r$) of the invention are more stable than those of the conventional motor.

Figure 12:
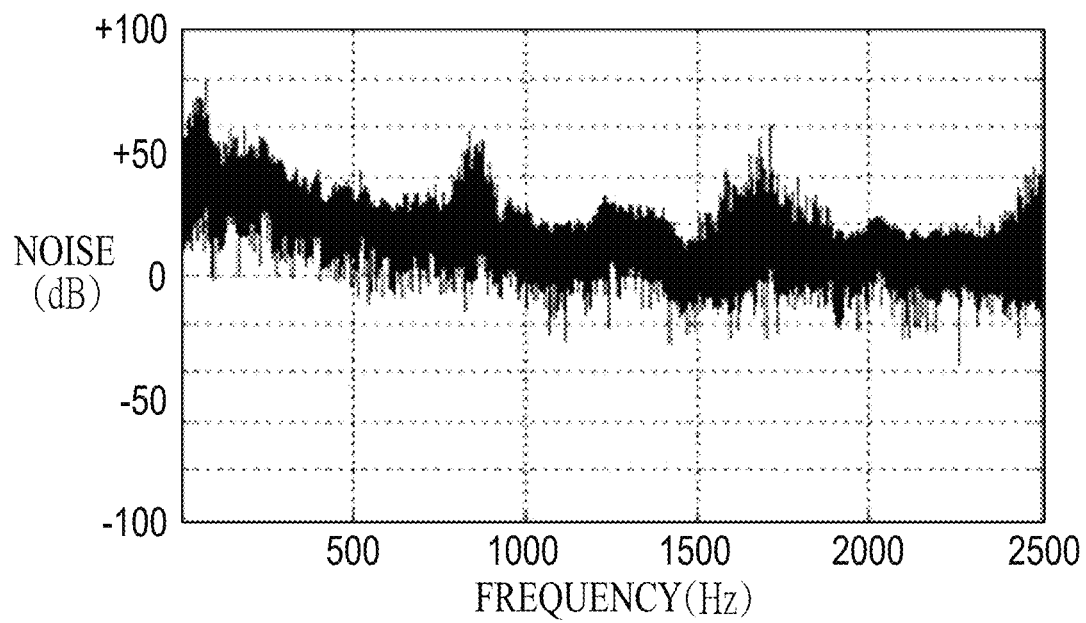
FIG. 12 is a wave diagram of high frequency noise of the motor of the invention.
Figure 13:
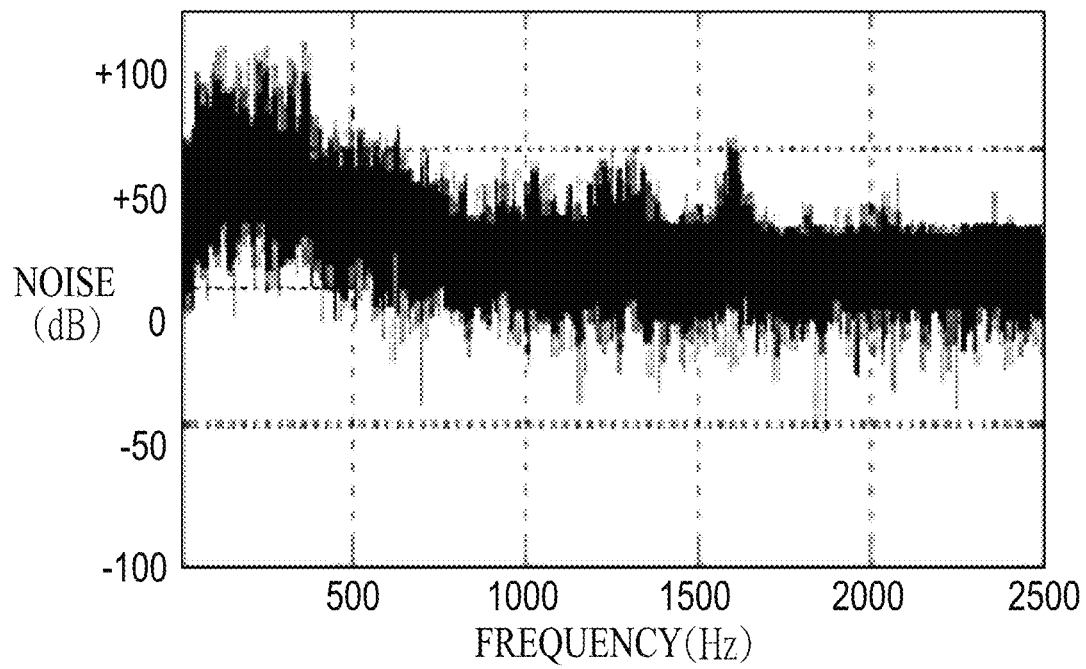
FIG. 13 is a wave diagram of high frequency noise of a conventional motor.

With reference to FIGS. 12 and 13, it is obvious that the high frequency noise of the invention shown in FIG. 12 is lower than that of the conventional motor shown in FIG. 13.

Figure 14:
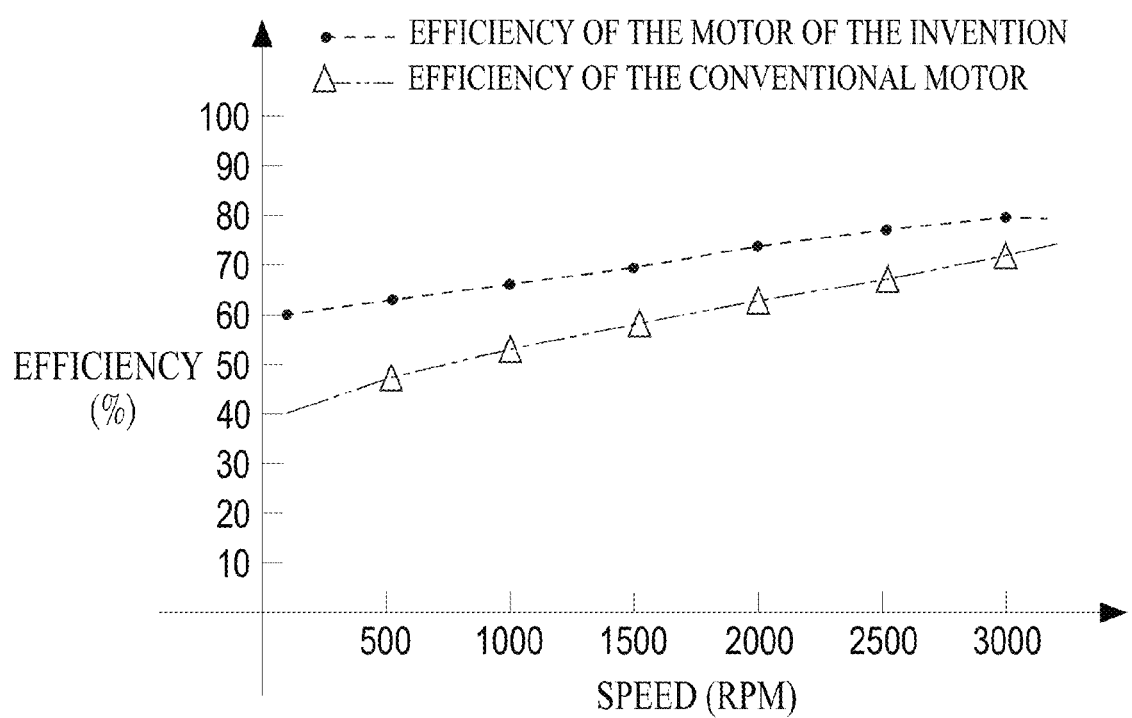
FIG. 14 is an efficiency chart of the motor of the invention and a conventional motor.

With reference to FIG. 14, motor efficiencies of the motor of the invention and the conventional motor are disclosed. The broken line is an efficiency waveform of the invention. The catenary line is an efficiency waveform of the conventional motor. The efficiency of the reluctance motor of the invention is higher than the conventional motor.

What is claimed is:

1. A control method for controlling a current vector controlled synchronous reluctance motor that comprises:
   a rotor unit having 4×N poles, wherein N is a positive integer; and
   a stator unit mounted around the rotor unit and having 6×N teeth respectively defined as a first tooth, a second tooth . . . and a $6N^{th}$ tooth, wherein
   each tooth has a coil mounted thereon in a same direction to form a U-phase winding, a V-phase winding and a W-phase winding;
   the U-phase winding is composed of the coils connected in series on the $3K+1^{th}$ teeth, K=0 to (2N−1);
   the V-phase winding is composed of the coils connected in series on the $3K+2^{th}$ teeth, K=0 to (2N−1);
   the W-phase winding is composed of the coils connected in series on the $3K+3^{th}$ teeth, K=0 to (2N−1);
   the U-phase winding, the V-phase winding and the W-phase winding are connected to form a Y connection circuit; and
   the coils generate magnetic field lines according to a balanced three-phase current applied to the U-phase winding, the V-phase winding and the W-phase winding; in the teeth of each phase winding, the coils induce same magnetic poles; magnetic routes are formed along adjacent teeth and the rotor unit;
the control method including steps of:
corresponndingly providing a vector of the balanced three-phase current on the U-phase winding, the V-phase winding and the W-phase winding;
calibrating a zero point position of a position encoder of the rotor unit;
adjusting an amplitude and a phase angle of the vector of the balanced three-phase current to control the phase angle to exceed the zero point position by δ degrees according to a base speed and a rated load of the reluctance motor, wherein δ=45°;
determining whether a present speed of the reluctance motor is faster than the base speed;
increasing the phase angle of the vector of the balanced three-phase current when the present speed is faster than the base speed, wherein the phase angle is limited to be less than an upper limit value but larger than 45°; and
decreasing the phase angle of the vector of the balanced three-phase current when the present speed is slower than the base speed, wherein the phase angle is limited to be larger than a lower limit value but less than 45°.

2. The control method as claimed in claim 1, wherein:
the upper limit value exceeds the zero point position by 60 degrees; and
the lower limit value exceeds the zero point position by 30 degrees.

3. The control method as claimed in claim 2, wherein:
the balanced three-phase current satisfies an equation of:

$$I_s = \begin{bmatrix} i_u \\ i_v \\ i_w \end{bmatrix} = I_m \begin{bmatrix} \cos(\omega_e t + \delta) & \sin(\omega_e t + \delta) \\ \cos\left(\omega_e t - \frac{2\pi}{3} + \delta\right) & \sin\left(\omega_e t - \frac{2\pi}{3} + \delta\right) \\ \cos\left(\omega_e t + \frac{2\pi}{3} + \delta\right) & \sin\left(\omega_e t + \frac{2\pi}{3} + \delta\right) \end{bmatrix};$$

$I_s$ is the vector of the balanced three-phase current for the stator unit;
$i_u$ is a U-phase current flowing through the U-phase winding;
$i_v$ is a V-phase current flowing through the V-phase winding;
$i_w$ is a W-phase current flowing through the W-phase winding;

$I_m$ is an amplitude of the vector of the balanced three-phase current;

$\omega_e$ is an angular frequency of the vector of the balanced three-phase current; and $\delta$ is a torque angle between the vector of the balanced three-phase current and a $d^r$ axis in a $d^r$–$q^r$ rotor coordinate system.

\* \* \* \* \*